United States Patent [19]

Schoennahl

[11] Patent Number: 5,053,366
[45] Date of Patent: Oct. 1, 1991

[54] REFRACTORY COMPOSITIONS CONTAINING MONOCLINIC ZIRCONIA AND ARTICLES FORMED FROM THESE COMPOSITIONS EXHIBITING IMPROVED MECHANICAL STRENGTH AT HIGH TEMPERATURES AND IMPROVED RESISTANCE TO THERMAL SHOCKS

[75] Inventor: Jacques Schoennahl, Villeurbanne, France

[73] Assignee: Savoie Refractaires, Venissieux, France

[21] Appl. No.: 520,750

[22] Filed: May 9, 1990

[30] Foreign Application Priority Data

May 26, 1989 [FR] France ............................ 89 06957

[51] Int. Cl.⁵ ............................................ C04B 35/10
[52] U.S. Cl. .................................. 501/127; 501/132; 501/153
[58] Field of Search ............... 501/105, 117, 127, 132, 501/153

[56] References Cited

U.S. PATENT DOCUMENTS 3,597,247  8/1971  Reardon .

FOREIGN PATENT DOCUMENTS 0218026  4/1987  European Pat. Off. .
0252598  1/1988  European Pat. Off. .
2065632  7/1981  United Kingdom .

Primary Examiner—William R. Dixon, Jr.
Assistant Examiner—Chris Gallo
Attorney, Agent, or Firm—Stevens, Davis, Miller & Mosher

[57] ABSTRACT

The invention relates to a refractory composition comprising, by weight:
(A) at least 70% of an aggregate based on refractory oxides,
(B) from 7 to 25% of a matrix consisting of particles distributed between a fine fraction made up of a proportion of at least 95% of its weight of particles from 1 to 20 μm in size, the median diameter of these particles being between 3 and 8 μm, this fine fraction constituting 1 to 24% of the composition, and an ultrafine fraction consisting of a proportion of at least 70% of its weight of particles smaller than 1 μm in size, the median diameter of these particles being between 0.3 and 0.8 μm, this ultrafine fraction constituting 1 to 24% of the composition, the said matrix comprising
  (i) at least one oxide chosen from the group consisting of $Al_2O_3$ and $Cr_2O_3$ and constituting 6 to 24% of the composition,
  (ii) monoclinic zirconia in a proportion constituting from 1 to 9% of the composition, and
  (iii) not more than 1% of silica relative to the weight of the composition; and
(C) a total from 0 to 6% of one or more additives.

Use in the glassmaking and metallurgical industries.

12 Claims, 1 Drawing Sheet a — Ground zirconium silicate
b — Calcined alumina
c — Zirconia CC 10
d — Pigment-grade chromium oxide
e — Micronized alumina

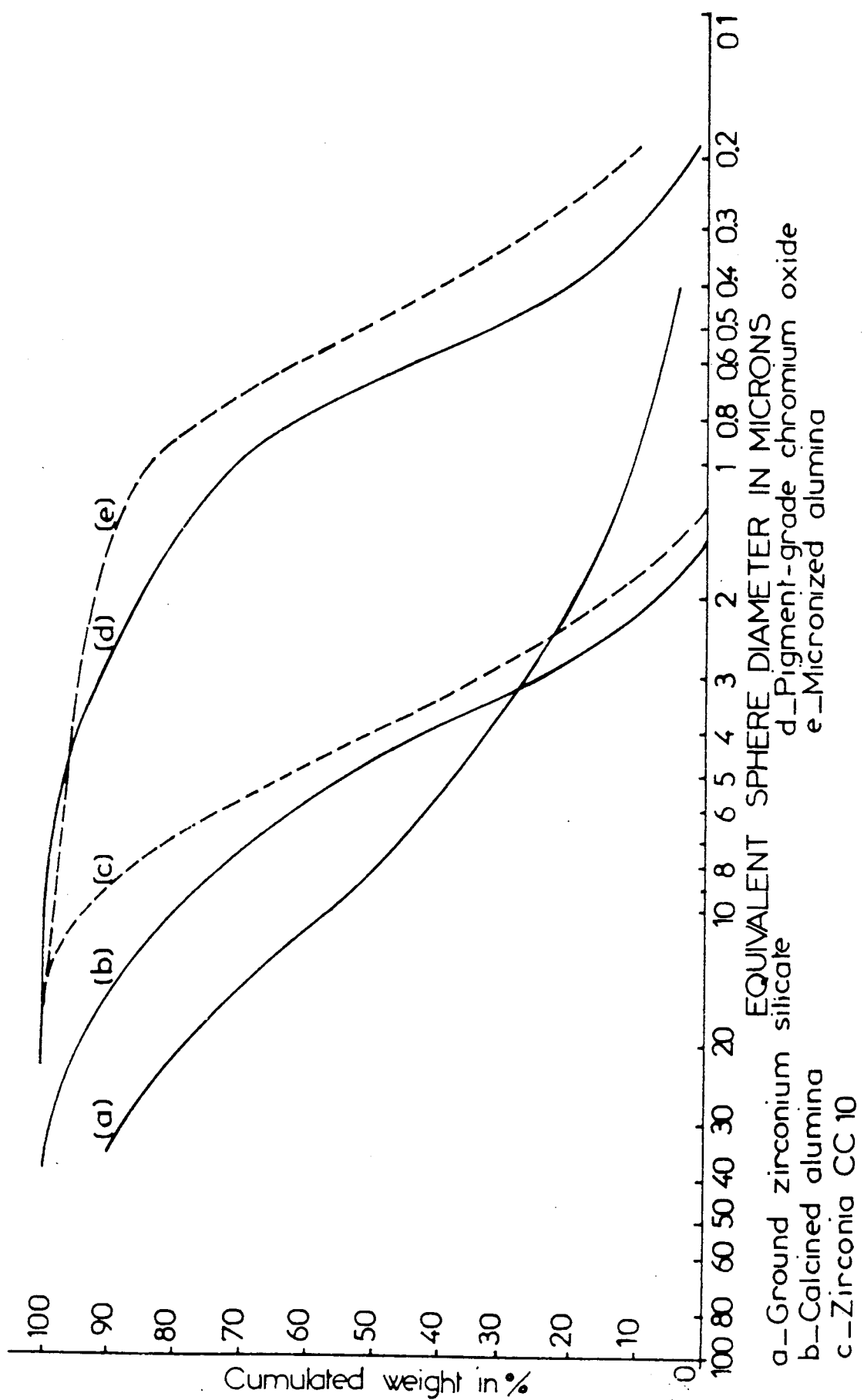

REFRACTORY COMPOSITIONS CONTAINING MONOCLINIC ZIRCONIA AND ARTICLES FORMED FROM THESE COMPOSITIONS EXHIBITING IMPROVED MECHANICAL STRENGTH AT HIGH TEMPERATURES AND IMPROVED RESISTANCE TO THERMAL SHOCKS

The invention relates to new refractory compositions containing monoclinic zirconia and to articles formed from these compositions exhibiting improved mechanical strength at high temperatures and improved resistance to thermal shocks.

Glassmaking and metallurgical industries require increasingly efficient refractory materials.

The present invention is therefore aimed at providing refractory compositions capable of being converted into materials or articles exhibiting improved resistance to thermal shocks and properties of mechanical strength at high temperatures corrosion resistance and porosity which are similar or superior to those of materials or articles which are employed at present.

More particularly, the invention relates to a refractory composition comprising, by weight:
(A) at least 70% of an aggregate based on refractory oxides, consisting of a proportion of at least 90% of its weight of particles larger than 20 μm but smaller than 20 mm in size,
(B) from 7 to 25% of a matrix consisting of particles distributed between a fine fraction made up of a proportion of at least 95% of its weight of particles from 1 to 20 μm in size, the median diameter of these particles being between 3 and 8 μm, this fine fraction constituting 1 to 24% of the composition, and an ultrafine fraction consisting of a proportion of at least 70% of its weight of particles smaller than 1 μm in size, the median diameter of these particles being between 0.3 and 0.8 μm, this ultrafine fraction constituting 1 to 24% of the composition, the said matrix comprising
  (i) at least one oxide chosen from the group consisting of $Al_2O_3$ and $Cr_2O_3$ and constituting 6 to 24% of the composition, the $Cr_2O_3$ present in the matrix constituting not more than 16% of the composition,
  (ii) monoclinic zirconia in a proportion constituting from 1 to 9% of the composition, and
  (iii) 0 to 1% of silica relative to the weight of the composition; and
(C) a total from 0 to 6% of one or more additives.

The aggregate (A) forms at least 70% of the weight of the composition and consists of a proportion of at least 90% of its weight of particles larger than 20 μm but smaller than 20 mm in size.

The aggregate based on refractory oxides may be made up of any refractory materials which are suitable for glassmaking or metallurgical applications, for example corundum, especially black corundum, chromium oxide, especially sintered, and electrocast materials based on $Al_2O_3$-$Cr_2O_3$, based on $Al_2O_3$-$ZrO_2$-$SiO_2$-$Cr_2O_3$ or based on $MgO$-$Cr_2O_3$.

The matrix (B) consists of particles distributed between a fine fraction made up of a proportion of at least 95% of its weight of particles of 1 to 20 μm in size, the median diameter of these particles being between 3 and 8 μm, this fine fraction constituting from 1 to 24% of the composition, and an ultrafine fraction consisting of a proportion of at least 70% of its weight of particles smaller than 1 μm in size, the median diameter of these particles being between 0.3 and 0.8 μm, this ultrafine fraction constituting from 1 to 24% of the weight of the composition, provided that the total of fine fraction + ultrafine fraction constitutes from 7 to 25% of the weight of the composition. It should be noted that the ultrafine fraction may contain up to 30% of particles larger than 1 μm but smaller than 4 μm, because it is impossible in practice to separate off particles smaller than 1 μm selectively in a particle size fraction. In fact, these ultrafine particles have a bell-shaped particle size distribution in the range extending from approximately 0.01 to 4 μm.

From the point of view of chemistry, the matrix (B) consists (i) of at least one oxide chosen from $Al_2O_3$ and $Cr_2O_3$ and which constitutes 6 to 24% of the weight of the composition, preferably 6 to 17%, provided that the $Cr_2O_3$ present in the matrix does not form more than 16% of the weight of the composition, and (ii) of monoclinic zirconia in a proportion constituting 1 to 9% of the weight of the composition, preferably from 2 to 8%. The matrix (B) must not, furthermore, contribute more than 1% of silica relative to the weight of the composition and is preferably substantially free from silica. The monoclinic zirconia constitutes the key ingredient of the composition of the invention, because it is that which makes it possible to obtain the improvement in resistance to thermal shocks. It should be noted, however, that incorporation of more than 8-9% of monoclinic zirconia in the matrix does not give any additional improvement in resistance to thermal shock. Within the scope of the invention, the expression "monoclinic zirconia" denotes any zirconia comprising at least 80% by weight of the monoclinic phase. Besides pure monoclinic zirconia, therefore, this expression includes zirconias which are partially stabilized, for example with lime. The monoclinic zirconias employed may originate from any sources, for example chemical, pure electrocast partially stabilized or natural (baddeleyite).

The optional constituent (C) of the composition of the invention may consist of one or more additives and constitutes not more than 6% of the weight of the composition.

As examples of additives which can be employed there may be mentioned, no limitation being implied:
  organic temporary binders such as resins, carboxymethyl cellulose, dextrin, and the like;
  chemical binders such as phosphoric acid, aluminium monophosphate, and the like;
  hydraulic binders, such as alumina cements like Secar 71 cement;
  deflocculants such as alkali metal polyphosphates;
  sintering promoters such as titanium dioxide (in a proportion not exceeding approximately 2% of the weight of the composition) or magnesium hydroxide.

In the case where the composition contains a chemical or hydraulic binder, it then constitutes a concrete, which can be employed using vibration, setting cold in the presence of water.

The composition of the invention can be shaped to the desired shape in a mould of appropriate geometry using pressing and sintering at high temperature (for example to manufacture bricks) or may be applied as a lining, for example by ramming, or may be employed for the purpose of repairing damaged furnace parts. Other embodiments of the composition of the invention will be obvious to the specialist.

The matrix (B) is the active portion of the composition, which will be the seat of sintering phenomena at high temperature, while the aggregate (A) remains inert during the sintering process. The sintering temperature to be employed is a function of the composition of the matrix (B), but a temperature of the order of 1500° C. will be usually suitable in most cases.

The products of the invention can be used, for example, in the form of chromium oxide-based sintered blocks for lining the vessels of melting furnaces for textile glasses; of continuous casting nozzles based on refractory material of the sintered $Al_2O_3$-$Cr_2O_3$ type; and of casting channels of steelmaking electrical arc furnaces made of concrete with a high alumina (corundum) content.

The following nonlimiting examples are given with a view to illustrating the invention. In these examples, the following tests have been employed for measuring the properties of resistance to thermal shock, of flexural strength, of creep strength at 1500° C. and of corrosion resistance.

Test for resistance to thermal shock:

The standardized test PRE III.26/PRE/R.5.1/78 was adopted for determining the behaviour towards thermal shock using the relative loss of flexural strength ($\Delta$MOR) after one or more cycles, each consisting in heating the test specimen from room temperature up to a maximum temperature T, in keeping the specimen at this temperature T for 30 minutes and in then plunging the specimen into cold water.

The specimens are 125×25×25 mm bars comprising no skin face.

The maximum temperature T is adjusted as a function of the sensitivity to thermal shock of the type of product being investigated. Thus, in the case of products with a very high $Cr_2O_3$ content (products of Table 2), which are extremely sensitive to thermal shock, the maximum temperature adopted is 1000° C., whereas it is 1200° C. in the case of the other products.

Test for flexural strength at 1500° C.

The standard PRE III.25/R.18/78 was employed.

Test for creep strength at 1500° C.

The standardized test PRE III.24/PRE/R6/78 was employed, which is a test for creep at constant temperature (1500° C.) under a compressive stress.

Test for corrosion resistance:

A dynamic corrosion, so-called "small rotating furnace", test was employed, such as described at the 8th International Glass Congress in London in 1968, in which the volume of corroded material or the depth of the scar formed is measured. Depending on requirements, a glass or a metal or a slag in the molten state is employed as the attacking agent in this test.

In the case of products of Table 3, the internal lining of this rotating furnace comprised 12 arch stones consisting of the material to be tested, forming a crown with an internal diameter of 270 mm and 100 mm in height, rotating at 6 revolutions per minute. The slags were melted beforehand in an electrical furnace and were introduced into the corrosion furnace at the test temperature. In the case of the test with slag (a), the duration was 72 hours at 1500° C. and this slag was made up, by weight, of:

FeO: 26.6%
$SiO_2$: 28.9%
CaO: 15.4%
ZnO: 9.8%
$Al_2O_3$: 7.8%
SnO: 5.5%
PbO: 1.2% and
MgO: 1.45%

In the case of the test with the slag (b), this slag was made up of fayalite obtained by previously fusing 70% by weight of iron scales and 30% by weight of silica, the duration was 6 hours and the atmosphere in the rotating furnace was kept reductive using 4% by volume of CO.

The following raw materials were employed in the examples:

The single FIGURE is a graph showing the particle size characteristics of the various components constituting the matrix, either for the products according to the invention or for the control products, described in the examples.

Zirconia CC10 is a monoclinic zirconia sold by the Société Européenne des Produits Réfractaires which comprises 98.5% by weight of $ZrO_2+HfO_2$, and has a median particle diameter of 3.9 μm and a density of 5750 kg/m$^3$.

The reground zirconium silicate employed in a control product is obtained from a zircon sand which analyses by titration for approximately 65% of $ZrO_2$, 34% of $SiO_2$ and 1% of impurities by weight.

The calcined alumina and the micronized alumina have the particle size characteristics shown in the FIGURE. Their median diameters are approximately 4.5 μm and 0.45 μm respectively.

The pigment-grade chromium oxide is an oxide containing more than 98% of $Cr_2O_3$. Its median diameter is approximately 0.65 μm.

The thermal silica is a silica consisting essentially of microspheres of vitreous silica 90% of whose particles are smaller than 4 μm and 10% smaller than 0.2 μm, the median diameter of the particles being 0.7 μm; they have a BET specific surface of 12.7 m$^2$/g and have the following average chemical analysis, by weight: $SiO_2>94\%$, $Al_2O_3=3.4\%$, $ZrO_2=1.3\%$, $Fe_2O_3=0.25\%$, $Na_2O=0.16\%$ and CaO=0.10%.

The products employed as additives are:
Secar 71 cement sold by Lafarge.
The titanium oxide is the anatase grade sold by Thann et Mulhouse.
Bentonil C is a bentonitic clay.
The dextrin is a well-known organic binder.
FFB32 is a commercial acidic aluminium phosphate sold by the Société de Matiére et de Gestion Industrielle.
The deflocculants are commercial polyelectrolytes such as sodium polyphosphates.
The magnesium hydroxide is the common commercial product.
The aggregates employed in the examples of Tables 1 to 7 are:
black corundum
CR100 chamotte which is a chromium oxide sintered in the presence of 2% of $TiO_2$, sold by the Applicant Company
Particles of the product ER 2161, which is an electrofused refractory of the $Al_2O_3$-$ZrO_2$-$SiO_2$-$Cr_2O_3$ type sold by the Société Européenne des Produits Réfractaires.

The following abbreviations have been used in the tables of the examples below:

The letter A after a constituent means that it is a component of the aggregate.

The letter M after a constituent means that it is a component of the matrix.

The letters AD after a constituent mean that it constitutes an additive.

It should be noted, furthermore, that the proportions of the constituents are given in % by weight relative to the overall composition, except in the case of some additives where the proportion is given in % by weight relative to the remainder of the composition. In this latter case, the percentage shown is preceded by the sign +.

EXAMPLE 1 AND CONTROL EXAMPLES 1 AND 2

Three concretes of the alumina-$Cr_2O_3$ type are prepared, which have the compositions shown in Table 1.

The concrete of Example 1 contains monoclinic zirconia in accordance with the present invention, whereas the concrete of control Example 1 contains no zirconia and the concrete of control Example 2 contains zirconium silicate.

After firing these concretes at 1500° C., their creep strength at 1500° C. was determined under a compressive stress of 2 bars, together with their resistance to thermal shock, using the abovementioned test.

The concrete of control Example 1 shows a poor resistance to thermal shock, being damaged after a single thermal cycle. The resistances to thermal shock of the concretes of Example 1 according to the invention and of control Example 2 are clearly improved by the addition of monoclinic zirconia and of zirconium silicate respectively. However, the concrete of control Example 2 shows a mediocre creep strength. Consequently, only monoclinic zirconia makes it possible to improve the resistance to thermal shock and to maintain a correct creep strength at the same time.

EXAMPLES 2 AND 3 AND CONTROL EXAMPLE 3

Three refractory compositions with a high content of $Cr_2O_3$ are prepared from the constituents shown in Table 2. These compositions are then pressed in moulds under a pressure of 800 bars and are then fired at 1500° C. in order to sinter the matrix.

From the properties of the products it can be seen that the incorporation of monoclinic zirconia in the products of Examples 2 and 3 greatly improves the thermal shock resistance of the sintered products compared with that of the product of control Example 3, which is devoid of zirconia, and this is proportionately more so the higher the proportion of monoclinic zirconia.

EXAMPLE 4 AND CONTROL EXAMPLE 4

Two concretes are prepared, comprising an aggregate of the $Al_2O_3$-$Cr_2O_3$-$ZrO_2$-$SiO_2$ type of similar compositions which are shown in Table 3, except that monoclinic zirconia is substituted in Example 4 for the alumina present in the matrix of control Example 4.

From the results given in Table 3 it can be seen that, although a large quantity of zirconia is contributed by the aggregate in both cases, the incorporation of monoclinic zirconia in the matrix greatly improves resistance to thermal shock.

EXAMPLE 5 AND CONTROL EXAMPLE 5

Two refractory bricks with a low content of $Cr_2O_3$ and with a phosphoric binder, which have the compositions referred to in Table 4, are prepared by pressing followed by firing at 1500° C., the matrix of one of these bricks containing monoclinic zirconia (Example 5) and the matrix of the other (control 5) containing none.

From the results given in Table 4 it can be seen that the presence of monoclinic zirconia in the matrix of the brick of Example 5 markedly improves the thermal shock resistance of the brick. It can be seen that the mechanical strength properties of the brick according to the invention are maintained at high temperature (1600° C.) at a level which is considerably higher than that of the control brick.

EXAMPLE 6 AND CONTROL EXAMPLE 6

Two alumina-based refractory concretes are prepared, whose matrix contains $Cr_2O_3$ and $Al_2O_3$ and which have the compositions shown in Table 5, the matrix of one (Example 6) containing monoclinic zirconia and the matrix of the other (control Example 6) containing none.

From the test results obtained, which are shown in Table 5, it can be seen that incorporation of monoclinic zirconia in the matrix appreciably improves the thermal shock resistance of the refractory concrete, while not affecting the high-temperature creep strength.

EXAMPLE 7 AND CONTROL EXAMPLE 7

Two alumina-based refractory concretes are prepared, which have the compositions shown in Table 6, the matrix of one (Example 7) containing monoclinic zirconia and the matrix of the other (control Example 7) containing none.

From the test results which are summarized in Table 6 it can be seen that incorporation of monoclinic zirconia in the matrix of the concrete according to the invention greatly improves resistance to thermal shock.

EXAMPLE 8

This example shows that incorporation of monoclinic zirconia is of interest only when the matrix contributes not more than 1% by weight of silica relative to the composition.

A series of six refractory concretes A to F containing increasing proportions of silica in the matrix and containing or not containing monoclinic zirconia in the matrix was prepared. The compositions of these concretes and their properties are summarized in Table 7. Concretes B and D form part of the invention.

From the results it can be seen that incorporation of monoclinic zirconia has a beneficial effect on the thermal shock resistance so long as the proportion of silica in the matrix does not exceed 1% by weight relative to the composition. In the case of higher proportions of silica, the incorporation of monoclinic zirconia gives no particular advantage in practice, since the products with a high content of ultrafine silica exhibit good behaviour towards thermal shock intrinsically, although at the cost of their corrosion resistance, which is poor.

EXAMPLE 9

In this example the action of the introduction of electrocast monoclinic zirconia with a particle size with a median diameter of approximately 300 μm (aggregate) was compared with that of the introduction of chemical monoclinic zirconia with a particle size with a median diameter of approximately 4 μm (matrix) when preparing concretes which have compositions derived from that of composition A in Table 7.

In the first case, 4% of corundum 0.2-2 mm in size was replaced with 4% of electro cast zirconia with a median diameter of 300 μm and, in the second case, 4% of calcined alumina was replaced with monoclinic zirconia with a median diameter of 4 μm.

In the case of the incorporation of zirconia 300 μm in size, a ΔMOR%, 1 cycle value of −93 was obtained, whereas in the case of the incorporation of zirconia 4 μm in size, a ΔMOR%, 1 cycle value of −86 was obtained, the concretes having been fired at 1500° C.

It is obvious that the embodiments described are merely examples and that they could be modified, especially by substitution of technical equivalents, without departing thereby from the scope of the invention.

TABLE 1

| Constituents of the concrete | | | Control product 1 | Ex. 1 | Control product 2 |
|---|---|---|---|---|---|
| Black corundum 5/10 mm | A | | 25 | 24 | 25 |
| Black corundum 2/5 mm | A | | 20 | 20 | 20 |
| Black corundum 0.2/2 mm | A | | 20 | 20 | 16 |
| Black corundum 0/0.2 mm | A | | 15.1 | 15 | 12 |
| Calcined alumina | M | | 6 | 3 | 4.5 |
| Pigment-grade chromium oxide | M | | 10 | 10 | 10.5 |
| Zirconia CC 10 ($d_{50} = 3.9$ μm) | M | | — | 4 | — |
| Ground zirconium silicate | M | | — | — | 8 |
| Secar 71 cement | AD | | 4 | 4 | 4 |
| Deflocculant | AD | | +0.2 | +0.2 | +0.2 |
| Water addition, % relative to the composition | | | 2.9 | 2.8 | 3.0 |
| Apparent density | | | 3.50 | 3.49 | 3.53 |
| Concrete fired at 1500° C. | Overall composition | $Al_2O_3$ (%) | 85 | 81 | 77 |
| | | $Cr_2O_3$ (%) | 10.0 | 10.0 | 10.2 |
| | | $SiO_2$ (%) | 0.6 | 0.6 | 3.2 |
| | | $ZrO_2$ (%) | 0 | 4 | 5.3 |
| | Properties | Creep, 1500° C./2 bars | | | |
| | | 5 h to 29 h (%) | 0 | 0 | −0.3 |
| | | speed/100 h (%) | 0 | 0 | −0.9 |
| | | Thermal shock resistance[1] Δ MOR (%) | −100 | −86 | −64 |

[1] 20° C.-1200° C. - cold water cycle

TABLE 2

| | Constituents | | Control product 3 | Ex. 2 | Ex. 3 |
|---|---|---|---|---|---|
| Refractory composition | Chamotte CR 100 2/4 mm | A | 12 | 12 | 12 |
| | Chamotte CR 100 0.5/2 mm | A | 31.6 | 31.6 | 31.6 |
| | Chamotte CR 100 0/0.5 mm | A | 45 | 41 | 37 |
| | Pigment-grade chromium oxide | M | 10 | 10 | 10 |
| | Zirconia CC 10 | M | — | 4 | 8 |
| | $TiO_2$ | AD | 0.4 | 0.4 | 0.4 |
| | Bentonil C | AD | 1 | 1 | 1 |
| | Dextrin | AD | +0.5 | +0.5 | +0.5 |
| | Water added, % relative to the weight of the composition | | 1.8 | 2.2 | 2.4 |
| Sintered pressed product | Density in the green state | | 4.35 | 4.37 | 4.34 |
| | Overall chemical composition | $Cr_2O_3$ (%) | 96.4 | 92.4 | 88.4 |
| | | $Al_2O_3$ (%) | 0.4 | 0.4 | 0.4 |
| | | $TiO_2$ (%) | 2.0 | 1.9 | 1.8 |
| | | $ZrO_2$ (%) | 0 | 4 | 8 |
| | Properties | Density | 4.34 | 4.35 | 4.33 |
| | | Porosity (%) | 13.7 | 14.1 | 14.8 |
| | | Cold MOR[2] (bars) | 297 | 253 | 263 |
| | | Thermal shock resistance[1] | | | |
| | | ΔMOR (%) 1 cycle | −100 | −85 | −81 |
| | | ΔMOR (%) 3 cycles | −100 | −92 | −88 |

[1] 20° C.-1000° C. - water cycle
[2] MOR = flexural strength

TABLE 3

| Constituents of the concrete | | Control product 4 | Ex. 4 |
|---|---|---|---|
| Aggregate ER 2161 - 2/4 mm | A | 35 | 35 |
| Aggregate ER 2161 - 0.5/2 mm | A | 18 | 18 |
| Aggregate ER 2161 - 0/0.5 mm | A | 8 | 8 |
| Black corundum - 0/0.2 mm | A | 15 | 15 |
| Pigment-grade chromium oxide | M | 15 | 15 |
| Secar 71 cement | AD | 4 | 4 |
| Deflocculant | AD | +0.2 | +0.2 |
| Calcined alumina | M | 5 | — |
| Zirconia CC 10 | M | — | 5 |
| Water | | +3.6 | +3.4 |
| Concrete annealed at 450° C. | Density | 3.55 | 3.53 |
| | Porosity (%) | 14 | 14 |
| | Mechanical strength | 1040 | 1180 |

TABLE 3-continued

| Constituents of the concrete | | | Control product 4 | Ex. 4 |
|---|---|---|---|---|
| Concrete fired at 1500° C. (bars) | Al$_2$O$_3$ (%) | | 39.6 | 34.7 |
| | Cr$_2$O$_3$ (%) | | 30.4 | 30.4 |
| | ZrO$_2$ (%) | | 17.3 | 22.2[2] |
| | SiO$_2$ (%) | | 9 | 9 |
| | Cold MOR (bars) | | 280 | 280 |
| | MOR at 1500° C. (bars) | | 70 | 95 |
| | Thermal shock resistance[1] | | −89 | −80 |
| | ΔMOR (%), 1 cycle | | | |
| | Corrosion resistance at 1500° C. (scar in mm) | | | |
| | (a) slag | | ≈2 | ≈2.1 |
| | (b) fayalite | | ≈6 | ≈7 |

[1] 20° C.–1200° C. - water cycle
[2] of which 5% contributed by the zirconia CC 10 of the matrix.

TABLE 4

| Constituents of the bricks | | | Control 5 | Ex. 5 |
|---|---|---|---|---|
| Black corundum 2/5 mm | A | | 36 | 36 |
| Black corundum 0.2/2 mm | A | | 31 | 31 |
| Black corundum 0/0.2 mm | A | | 14 | 14 |
| Pigment-grade chromium oxide | M | | 10 | 10 |
| FFB32 | AD | | +3 | +3 |
| Dextrin | AD | | +0.3 | +0.3 |
| Calcined alumina | M | | 9 | 5 |
| Zirconia CC 10 | M | | — | 4 |
| Brick sintered at 1500° C. | Overall composition | Al$_2$O$_3$ (%) | 86 | 82 |
| | | Cr$_2$O$_3$ (%) | 9.5 | 9.5 |
| | | SiO$_2$ (%) | 0.7 | 0.7 |
| | | ZrO$_2$ (%) | 0 | 4 |
| | Properties | Apparent density | 3.60 | 3.65 |
| | | Open porosity (%) | 9.8 | 11.2 |
| | | Cold flexural strength (bars) | 340 | 307 |
| | | Flexural strength at 1500° C. (bars) | 230 | 278 |
| | | Flexural strength at 1600° C. (bars) | 150 | 197 |
| | | Thermal shock resistance[1] | | |
| | | ΔMOR (%), 1 cycle | −88 | −79 |
| | | ΔMOR (%), 3 cycles | −92 | −84 |

[1] 20° C.–1200° C. - water cycle

TABLE 5

| Constituents of the concrete | | | Control 6 | Ex. 6 |
|---|---|---|---|---|
| Black corundum 5/10 mm | A | | 23 | 23 |
| Black corundum 2/5 mm | A | | 23 | 22 |
| Black corundum 0.2/2 mm | A | | 20 | 20 |
| Black corundum 0/0.2 mm | A | | 17 | 17 |
| Pigment-grade chromium oxide | M | | 4 | 4 |
| Calcined alumina | M | | 9 | 6 |
| Zirconia CC 10 | M | | — | 4 |
| Secar 71 cement | AD | | 4 | 4 |
| Deflocculant | AD | | +0.2 | +0.2 |
| Water | | | +3.5 | +3.3 |
| Concrete fired at 1500° C. | Overall composition | Al$_2$O$_3$ (%) | 91 | 87 |
| | | Cr$_2$O$_3$ (%) | 4 | 4 |
| | | SiO$_2$ (%) | 0.6 | 0.6 |
| | | ZrO$_2$ (%) | 0 | 4 |
| | Properties | Density | 3.40 | 3.47 |
| | | Cold MOR (bars) | 370 | 295 |
| | | Thermal shock resistance[1] | | |
| | | ΔMOR (%), 1 cycle | −95 | −86 |
| | | ΔMOR (%), 3 cycles | −100 | −97 |
| | | Creep strength at 1500° C./2 bars | | |
| | | 5 h to 29 h (%) | −0.18 | −0.14 |
| | | V/100 h (%) | −0.50 | −0.45 |

[1] 20° C.–1200° C. - water cycle

TABLE 6

| Consitutents of the concrete | | | Control 7 | Ex. 7 |
|---|---|---|---|---|
| Black corundum 5/10 mm | A | | 22 | 22 |
| Black corundum 2/5 mm | A | | 22 | 22 |
| Black corundum 0.2/2 mm | A | | 22 | 22 |
| Black corundum 0/0.2 mm | A | | 16.5 | 16.5 |
| Micronized alumina | M | | 4.0 | 4.0 |
| Secar 71 cement | AD | | 3.8 | 3.8 |
| Magnesium hydroxide | AD | | 1.0 | 1.0 |
| Deflocculant | AD | | +0.15 | +0.15 |
| Calcined alumina | M | | 8.7 | 4.7 |
| Zirconia CC 10 | M | | — | 4 |
| Water | | | +3.5 | +3.6 |
| Properties of the concrete annealed at 450° C. | | Density | 3.31 | 3.30 |
| | | Porosity (%) | 16.0 | 17.2 |
| | | Mechanical strength (bars) | 730 | 580 |
| Concrete fired at 1500° C. | Overall composition | Al$_2$O$_3$ (%) | 94.8 | 90.8 |
| | | SiO$_2$ (%) | 0.6 | 0.6 |
| | | ZrO$_2$ (%) | 0 | 4 |
| | Properties | Cold MOR (bars) | 230 | 250 |
| | | Thermal shock[1] | | |
| | | ΔMOR (%), 1 cycle | −91 | −84 |
| | | ΔMOR (%), 3 cycles | −100 | −92 |

[1] 20° C.–1200° C. - water cycle

TABLE 7

| Constituents of the concrete | | | A | B | C | D | E | F |
|---|---|---|---|---|---|---|---|---|
| Black corundum 5/10 mm | A | | 23 | 23 | 25 | 24 | 25 | 25 |
| Black corundum 2/5 mm | A | | 23 | 22 | 20 | 20 | 20 | 20 |
| Black corundum 0.2/2 mm | A | | 20 | 20 | 20 | 20 | 20 | 20 |
| Black corundum 0/0.2 mm | A | | 17 | 17 | 19 | 19 | 15 | 15 |
| Calcined alumina | M | | 9 | 6 | 9 | 6 | 9 | 5 |
| Secar 71 cement | AD | | 4 | 4 | 2 | 2 | 2 | 2 |
| Pigment-grade chromium oxide | M | | 4 | 4 | 4 | 4 | 4 | 4 |
| Thermal silica | M | | — | — | 1 | 1 | 5 | 5 |
| Zirconia CC 10 | M | | — | 4 | — | 4 | — | 4 |
| Deflocculant | AD | | +0.2 | +0.2 | +0.2 | +0.2 | +0.2 | +0.2 |
| Properties | Concrete annealed at 400° C. | MS (bars) | 804 | 975 | 530 | 400 | 1017 | 1190 |
| | Concrete fired at 1500° C. | Thermal shock resistance[1] ΔMOR (%), | −95 | −86 | −93 | −86 | −88 | −89 |

TABLE 7-continued

| Constituents of the concrete | A | B | C | D | E | F |
|---|---|---|---|---|---|---|
| 1 cycle | | | | | | |

(1)20° C.-1200° C. - water cycle

What is claimed is:

1. A refractory composition comprising, by weight:
   (A) at least 70% of aggregate particles based on refractory oxides, at least 90% by weight of which have a size larger than 20 µm but smaller than 20 mm,
   (B) matrix particles comprised, on the basis of the refractory composition, of:
      (i) a total of 6 to 24% of $Al_2O_3$, and/or $Cr_2O_3$ particles with the proviso that said $Cr_2O_3$ particles do not exceed 16%;
      (ii) 1 to 9% of monoclinic zirconia particles; and
      (iii) 0 to 1% of silica particles;
      the total of matrix particles (i)+(ii)+(iii) constituting 7 to 25% of the refractory composition and said matrix particles being comprised of (a) fine particles at least 95% by weight of which have a size of 1 to 20 µm, said fine particles having a median diameter of 3 to 8 µm, and (b) ultra fine particles at least 70% by weight of which have a size smaller than 1 µm, said ultra fine particles having a median diameter of 0.3 to 0.8 µm, said fine particles constituting 1 to 24% of the refractory composition and said ultra fine particles constituting 1 to 24% of the refractory composition.
   (C) from 0 to 6% of at least one additive.

2. The refractory composition as claimed in claim 1, wherein the total of $Al_2O_3$ and of $Cr_2O_3$ present in the matrix constitutes from 6 to 17% of the weight of the composition.

3. The refractory composition as claimed in claim 1, wherein the monoclinic zirconia present in the matrix constitutes from 2 to 8% of the weight of the composition.

4. The refractory composition as claimed in claim 1, which contains a hydraulic binder as additive, so as to form a cold-setting concrete which sets in the presence of water.

5. The refractory composition as claimed in claim 1, which contains a chemical binder as additive, so as to form a cold-setting concrete which sets in the presence of water.

6. The refractory composition as claimed in claim 1, which contains a sintering promoter.

7. The refractory composition as claimed in claim 6, in which the sintering promoter is titanium dioxide in a proportion not exceeding 2% of the weight of the composition.

8. Refractory articles formed by sintering at high temperature a composition as claimed in claim 1.

9. Refractory articles and linings formed by setting a composition as claimed in claim 4.

10. Refractory articles and linings formed by setting a composition as claimed in claim 5.

11. The refractory composition of claim 1, which contains an organic temporary binder.

12. The refractory composition of claim 1 which contains deflocculants.

* * * * *